United States Patent [19]

Ohlinger et al.

[11] 4,362,708

[45] Dec. 7, 1982

[54] PREPARATION OF ACICULAR GAMMA-IRON(III) OXIDE OF HIGH COERCIVE FORCE

[75] Inventors: Manfred Ohlinger; Hans Reichert, both of Frankenthal; Guenter Vaeth, Limburgerhof; Friedrich R. Faulhaber, Mutterstadt; Horst Autzen, Freinsheim; Peter Rudolf, Neuhofen; Joachim Werther, Weisenheim, all of Fed. Rep. of Germany

[73] Assignee: BASF Aktiengesellschaft, Fed. Rep. of Germany

[21] Appl. No.: 320,014

[22] Filed: Nov. 10, 1981

[51] Int. Cl.³ .............................................. C01G 49/06
[52] U.S. Cl. ........................................................ 423/634
[58] Field of Search .................... 423/634, 632, 633; 252/62.56

[56] References Cited

U.S. PATENT DOCUMENTS

| 3,399,142 | 8/1968 | Conley | 423/634 X |
| 3,498,748 | 3/1970 | Greiner | 252/62.56 X |
| 4,221,776 | 9/1980 | Autzen et al. | 423/634 |

FOREIGN PATENT DOCUMENTS

| 2904085 | 8/1980 | Fed. Rep. of Germany | 423/634 |
| 1589355 | 5/1981 | United Kingdom | |

*Primary Examiner*—Jack Cooper
*Attorney, Agent, or Firm*—Keil & Witherspoon

[57] ABSTRACT

A process for the preparation of acicular gamma-iron-(III) oxide of high coercive force by reducing acicular iron(III) oxide hydroxide, as it is being passed continuously through a furnace having two or more heating zones at from 190° to 700° C., by means of a gas mixture which is produced by passing a stream of inert gas, heated to above 250° C., through an organic substance also heated to above 250° C. in a vessel, and, on introduction into the furnace, is first brought into contact with the α-iron(III) oxide formed from the iron(III) oxide hydroxide by elimination of water in the first heating zone of the furnace at from 190° to 250° C., the α-iron(III) oxide thereby being converted to magnetite which is subsequently oxidized with an oxygen-containing gas at from 150° to 400° C., to give gamma-iron(III) oxide.

3 Claims, No Drawings

PREPARATION OF ACICULAR GAMMA-IRON(III) OXIDE OF HIGH COERCIVE FORCE

The present invention relates to a process for the preparation of acicular gamma-iron(III) oxide of high coercive force by reducing acicular iron(III) oxide hydroxide at from 190° to 700° C. by means of a gaseous mixture of an inert gas and an organic substance which is decomposable above 250° C. in the presence of iron oxide, the reduction giving magnetite which is subsequently oxidized with an oxygen-containing gas at from 150° to 400° C. to give gamma-iron(III) oxide.

Acicular ferrimagnetic gamma-iron(III) oxide has long been employed extensively as magnetizable material in the manufacture of magnetic recording media. A large number of processes for its preparation have been disclosed. For example, as early a publication as British Pat. No. 675,260 describes a process for obtaining gamma-iron(III) oxide, wherein acicular α-iron oxide hydroxide (goethite) is dehydrated to α-iron(III) oxide, the latter is converted to magnetite in a reducing atmosphere at about 300° C., and the magnetite is oxidized to acicular gamma-iron(III) oxide in air at below 450° C. Both the dehydration of the iron oxide hydroxide and the subsequent reduction to magnetite require temperatures of above 300° C., and these result in undesirable sintering of the needles to give coarser particles. This in turn results in a reduction of the coercive force and accordingly a deterioration of the electro-acoustic properties.

According to a process disclosed in German Pat. No. 801,352, the non-magnetic iron oxides are converted to magnetite by treatment with salts of short-chain carboxylic acids and subsequent heating, and the magnetite is then oxidized to gamma-iron(III) oxide at from 200° to 400° C. U.S. Pat. No. 2,900,236 discloses that any organic compound which decomposes below 540° C., with little formation of tar and ash, may be used to reduce a non-magnetic iron oxide to magnetite. To do so, the iron oxide is brought into contact with the gaseous, solid or liquid organic substance and heated at 540°–650° C. Whilst U.S. Pat. No. 2,900,236 states that all organic substances conforming to the above requirements can be used, and specifically mentions wax, starch and oil, German published application DAS No. 1,203,656 mentions salts of soluble soaps, precipitated on the iron oxide, and East German Pat. No. 91,017 mentions long-chain carboxylic acids and their salts. According to a process described in German published application DAS No. 1,771,327, aliphatic monocarboxylic acids of 8 to 25 carbon atoms, which may or may not be mixed with morpholine, are added to the iron oxide hydroxide suspension even before the latter is processed further. In contrast, Japanese laid-open application No. 80,499/1975 discloses that an inert gas containing an organic compound which is liquid at room temperature but has a low boiling point, for example ethanol, is used as gaseous reducing agent, but only at the stage of reducing the non-magnetic iron oxide to magnetite. German laid-open application DOS No. 2,064,804 describes a process for the preparation of magnetic iron oxide wherein a non-magnetic iron oxide is heated with an organic compound, such as higher hydrocarbon, higher amine, higher fatty acid or salt thereof, oil, fat or wax, and the product is re-oxidized, if necessary. The addition of the organic compound to the non-magnetic iron oxide before heating can be effected by impregnating or coating the oxide. In German laid-open application DOS No. 2,805,405, which describes a process for preheating lepidocrocite, γ-FeOOH, before reduction to $Fe_3O_4$, it is stated that the conventional known organic compounds can be used for reduction; the products formed by preheating the lepidocrocite can be mixed mechanically with the organic compounds or be coated therewith in a suitable solution or suspension or be treated with the compounds in gaseous form together with an inert gas.

However, none of these processes has proved entirely satisfactory. If the iron oxide hydroxide suspensions are brought into contact with liquid or dissolved organic substances, hydrophobic materials are formed, and the requisite washing out of the inorganic salts from these materials after reduction is made much more difficult. These inorganic salts can, moreover, interfere with the formation of high quality gamma-iron(III) oxides. However, mixing the dry substances also gives unsatisfactory results, since a sufficiently homogeneous mixture is difficult to achieve, given the fact that the amount of organic substance is small compared to the iron oxide or iron oxide hydroxide, and that the pigment is highly agglomerated after drying; accordingly, inhomogeneous end products are obtained. If, in contrast, the reduction of the non-magnetic iron oxide or iron oxide hydroxide to magnetite is carried out in the manner already proposed, using a low-boiling organic compound which is liquid at room temperature but is employed as vapor or as a mixture with an inert gas, sintering of the finely divided materials occurs at the required reaction temperature of 300° C. or above, as it does when using conventional reducing gases, such as hydrogen or carbon monoxide, and this undesirable sintering has an adverse effect on the magnetic properties.

It is an object of the present invention to provide a process by means of which, starting from iron(III) oxide hydroxide, a pure gamma-iron(III) oxide of high coercive force is obtained under conditions which avoid the sintering processes which normally occur in the preparation of acicular gamma-iron(III) oxide.

We have found, surprisingly, that this object is achieved and that acicular gamma-iron(III) oxide can be prepared by reducing acicular iron(III) oxide hydroxide, which is being passed continuously through a furnace having two or more heating zones at from 190° to 700° C., by means of a gaseous mixture of an inert gas and an organic substance which is decomposable at above 250° C. in the presence of iron oxide, to give magnetite, and then oxidizing the magnetite with an oxygen-containing gas at from 150° to 400° C., if the gas mixture acting as the reducing agent is produced by passing a stream of inert gas, heated to above 250° C., through an organic substance also heated to above 250° C. in a vessel, and the gas mixture, on introduction into the furnace, is first brought into contact with the α-iron(III) oxide formed from the iron(III) oxide hydroxide by elimination of water in the first heating zone of the furnace at from 190° to 250° C.

In carrying out the process according to the invention, it has proved advantageous to use a gas mixture which contains from $2.10^2$ to $5.10^3$ parts by volume of inert gas per part by volume of organic substance. The organic substance contained in this gas mixture and acting as the reducing agent has a boiling point of above 250° C. and, preferably, a surface tension of from 27 to 30 dynes/cm, measured at 90° C., as well as a dielectric constant of from 2.2 to 2.6. In particular, stearic acid, oleic acid, soybean lecithin, palmitic acid or mixtures of these are employed for the process according to the invention. The acicular iron(III) oxide hydroxide used for the process is synthetic goethite or lepidocrocite or a coprecipitate of both these.

In the process according to the invention, the appropriate organic substance or mixture of substances is heated in a vessel at above 250° C., preferably 300° C., and a stream of inert gas, generally nitrogen, which has been heated to not less than the same temperature as the organic substance is passed through the latter. The resulting gas mixture is then passed, through heated lines, into the continuous furnace, possessing not less than two, and preferably three, heating zones, into the first of which, at from 190° to 250° C., the iron(III) oxide hydroxide is fed, if appropriate by means of a screw. In this heating zone, the temperature is kept below 250° C., both by appropriate temperature control and by the initially occurring dehydration of the iron(III) oxide hydroxide to α-iron(III) oxide. Thus, anhydrous α-iron(III) oxide at below 250° C. is formed in the first heating zone, and since the gas mixture enters at a higher temperature, at least a proportion of the organic subtance contained therein condenses on the oxide and is adsorbed as a monomolecular layer on the surface of the particles. The α-iron(III) oxide thus coated with organic substance is then reduced to magnetite in the remainder of the furnace, in the presence of an atmosphere consisting of residual organic substance, inert gas and steam, at from 300° to 700° C., preferably from 300° to 620° C., the carbon remaining on the surface of the acicular particles preventing the latter from sintering and caking.

The gaseous mixture of inert gas and organic substances is introduced in amounts which provide from 0.5 to 10, preferably from 2 to 6, percent by weight of organic substance, based on the amount of iron(III) oxide hydroxide; the mean residence time of the iron oxide in the furnace is from 20 to 150, preferably from 30 to 60, minutes. Examples of furnaces suitable for carrying out the process according to the invention are rotary tubular furnaces, powder drying furnaces having a plurality of rotatable porous members, as well as any similar apparatus provided it is divisible into not less than two, preferably not less than three, heating zones and provides substantially continuous flow of material.

The magnetite thus produced is then converted to gamma-iron(III) oxide in a conventional manner by means of an oxygen-containing gas, usually air, at from 150° to 400° C., preferably from 200° to 280° C.

The gamma-iron(III) oxide obtainable by the process according to the invention retains well the acicular shape of the iron oxide employed as starting material, and is distinguished especially by a high coercive force, values being obtained which in conventional methods of preparation are only achievable by adding cobalt.

The gamma-iron(III) oxides prepared according to the invention are therefore particularly suitable for the production of magnetic recording media. For this purpose, the magnetic material is dispersed in a solution of a polymeric binder. Suitable binders are the conventional compounds used for this purpose, such as polyamides, polyurethanes or mixtures of polyisocyanates and relatively high molecular weight polyhydroxy compounds, vinyl chloride polymers containing a predominant amount of vinyl chloride units, e.g. vinyl chloride copolymers with comonomers, e.g. monocarboxylic acid vinyl esters, esters of aliphatic alcohols and unsaturated carboxylic acids, e.g. acrylic acid, methacrylic acid or maleic acid, or these carboxylic acids themselves, as well as hydroxyl-containing vinyl chloride copolymers which may be used individually or as mixtures. The magnetic layer may additionally be subjected to crosslinking. To disperse the magnetic materials in the binder solution, it is advantageous to add conventional dispersants, for example fatty acid salts, soybean lecithin or other suitable materials, in amounts of from 0.5 to 6 percent by weight, based on the magnetic material. It is moreover usual to add lubricants such as esters, carboxylic acids or silicone oils, in amounts of from 0.5 to 10 percent by weight, to reduce the coefficient of friction of the magnetic layer. Other conventional additives which may be introduced into the dispersions are fillers, such as carbon black, graphite and/or non-magnetizable silicate-based powders. After dispersing has been effected, the dispersion is applied by means of known coating equipment to conventional polyethylene terephthalate films, a magnetic field being employed to orient the magnetic particles.

After the magnetic layer has been dried, it can, advantageously, be subjected to a surface treatment, e.g. calendered, following which the coated film can be slit to the desired width on conventional equipment for the production of magnetic recording media.

The Examples which follow illustrate the invention; the advance in the art represented by the invention is demonstrated by the Comparative Experiments.

The magnetic properties of the pigment are measured on an oxide sample having a tamped density D of 1.2 g/cm$^3$, using a conventional vibrating sample magnetometer at 100 kA/m field strenghth. The coercive force ($H_c$) is expressed in [kA/m], and the specific remanence ($M_r/\rho$) and specific magnetization ($M_m/\rho$) in [nT·m$^3$/g]. The magnetic tape samples are also examined at a field strength of 100 kA/m by means of a vibrating sample magnetometer. The coercive force $H_c$, the residual induction R in [mT] and the orientation ratio, ie. the ratio of residual induction in the direction of particle orientation to the residual induction at right angles thereto, are measured. The electro-acoustic properties of the tapes are measured according to DIN 45,512, Part II, against reference tape T 308 S, using an HF biasing current which is increased by 2 db with respect to the biasing current giving the maximum sensitivity. The signal-to-print-through ratio $K_d$ is expressed relative to reference tape T 308 S, the $K_d$ ratio of which is taken to be 0 db.

EXAMPLE 1

Gamma-iron(III) oxide hydroxide, having a specific surface area, measured by the BET method, of 32 m$^2$/g, and an average needle length of 0.5 μm, with a length/width ratio of 12:1, is conveyed continuously, at a rate of 20 kg per hour, through a rotary tubular furnace subdivided into 3 heating zones. At the same time, a stream of nitrogen of 30 m$^3$/h is passed through a vessel filled with stearic acid heated to 270° C. and is subsequently passed through the rotary furnace, together with the pigment fed into the furnace by means of a screw. In the furnace, the iron oxide is heated to a product temperature of 230, 450 and, finally, 620° C., in the three heating zones. The amount of stearic acid introduced into the furnace by the stream of nitrogen is 1 kg/h. After a residence time of 45 minutes, the magnetite drops through a discharge gate into a second rotary tubular furnace, in which it is oxidized by means of a stream of air to gamma-iron(III) oxide, the product temperature being 250° C. and the mean residence time again being 45 minutes. The results of the measurements on the end product are shown in Table 1.

EXAMPLE 2

The procedure described in Example 1 is followed, except that a commercial lecithin is employed in place of stearic acid. The results of the measurements are shown in Table 1.

EXAMPLE 3

In place of gamma-iron(III) oxide hydroxide, α-iron-(III) oxide hydroxide, having a specific surface area, measured by the BET method, of 33.5 m²/g, an average needle length of 0.6 μm and a length/width ratio of 15:1 is conveyed through the furnace at the rate of 20 kg per hour. At the same time, a stream of nitrogen of 30 m³/h is passed through a vessel filled with palmitic acid heated to 260° C. and is subsequently passed through the rotary furnace, together with the pigment fed into the furnace by means of a screw. The temperature profile and the other process data are as in Example 1. The results of the measurements are shown in Table 1.

EXAMPLE 4

The procedure described in Example 1 is followed, except that the pigment throughout is 40 kg/h and the product temperatures in heating zones 1, 2 and 3 are 220°, 460° and 650° C. respectively. The results of the measurements are shown in Table 1.

COMPARATIVE EXPERIMENT 1

Before further processing, the iron oxide hydroxide used in Example 1 is mixed for one hour with 5% by weight of stearic acid in a conventional tumbler mixer at 30 r.p.m. This mixture is converted to gamma-iron-(III) oxide by the method described in Example 1, except that the stream of nitrogen is fed to the reduction furnace direct, i.e. without being laden with stearic acid.

The results of measurements on the end product are shown in Table 1.

COMPARATIVE EXPERIMENT 2

The procedure described in Example 1 is followed, except that 30 m³/h of nitrogen, to which 10 m³/h of superheated ethanol vapor are admixed, are passed through the rotary tubular furnace.

The results of the measurements are shown in Table 1.

COMPARATIVE EXPERIMENT 3

The procedure described in Comparative Experiment 2 is followed, except that the ethanol vapor is replaced by the same amount of benzene vapor.

The results of the measurements on the end product are shown in Table 1.

COMPARATIVE EXPERIMENT 4

The procedure described in Comparative Experiment 2 is followed, except that the ethanol vapor is replaced by an equal quantity of hydrogen heated to 260° C.

The results of the measurements on the end product are shown in Table 1.

COMPARATIVE EXPERIMENT 5

The procedure described in Comparative Experiment 4 is followed, except that only 25 m³/h of hydrogen heated to 260° C. are introduced, without nitrogen.

The results of the measurements on the end product are shown in Table 1.

COMPARATIVE EXPERIMENT 6

500 kg of an acicular lepidocrocite as described in Example 1 are dehydrated to α-Fe₂O₃ in the course of one hour in a rotary tubular furnace at an average product temperature of 420° C., a stream of nitrogen preheated to 300° C. being introduced at the rate of 20 m³/h. Subsequent determination of the specific surface area by the BET method gives a value of 26.5 m²/g.

This product is then fed continuously, at a rate of 20 kg/h, into a rotary tubular furnace sub-divided into 3 heating zones which are respectively at 300°, 420° and 650° C., and at the same time a stream of nitrogen at the rate of 30 m³/h is passed first through a vessel filled with stearic acid heated to 270° C. and then, together with the product, through the furnace. The amount of stearic acid introduced by the stream of nitrogen is 1 kg/h. After a residence time of 45 minutes, the reduced product, i.e. the magnetite, drops through a discharge gate into a second rotary tubular furnace, in which it is oxidized by means of a stream of air to gamma-iron(III) oxide, at a product temperature of 250° C. and again with a mean residence time of 45 minutes.

The results of the measurements are shown in Table 1.

COMPARATIVE EXPERIMENT 7

A gamma-iron(III) oxide, prepared as described in Comparative Experiment 1 and having a coercive force of 24.8 kA/m is modified with 1.5% by weight of cobalt, by precipitation of a cobalt ferrite layer using the method described in German laid-open application DOS No. 2,650,890, to give a magnetic material having a coercive force of 29.5 kA/m.

The results of the other measurements are shown in Table 1.

TABLE 1

|  | Surface area measured by the BET method (m²/g) | Hc | $M_r/\rho$ | $M_m/\rho$ |
|---|---|---|---|---|
| Example 1 | 21.8 | 29.0 | 40.2 | 75.6 |
| Example 2 | 22.2 | 29.3 | 40.3 | 76.4 |
| Example 3 | 21.0 | 28.7 | 42.1 | 79.6 |
| Example 4 | 20.6 | 29.5 | 39.8 | 74.9 |
| Comparative Experiment 1 | 19.0 | 24.8 | 39.7 | 74.8 |
| Comparative Experiment 2 | 18.2 | 24.0 | 38.9 | 74.2 |
| Comparative Experiment 3 | 17.9 | 24.2 | 39.1 | 75.0 |
| Comparative Experiment 4 | 16.1 | 24.9 | 37.6 | 72.3 |
| Comparative Experiment 5 | 15.0 | 24.5 | 43.0 | 80.2 |
| Comparative Experiment 6 | 23.2 | 27.9 | 41.7 | 78.1 |
| Comparative Experiment 7 | 17.5 | 29.5 | 41.1 | 79.2 |

EXAMPLES A TO L

Each of the magnetic materials of Examples 1 to 4 and of Comparative Experiments 1 to 7 is processed into a magnetic dispersion as follows: 20,000 parts of steel balls, 2,700 parts of the magnetic material, 67 parts of dispersant having a betaine structure, 15 parts of a silicone oil, 15 parts of a mixture of dicarboxylic acids of 12 to 19 carbon atoms, 400 parts of a commercial isocyanate-free polyester-urethane obtained from adipic acid, butane-1,4-diol and 4,4-dicyanato-diphenyl-methane and having a K value of 63 (measured on a 1% strength solution in tetrahydrofuran) and 200 parts of a vinyl chloride/ethyl maleate copolymer having a K value of 59 (measured on a 1% strength solution in tetrahydrofuran), and 7,000 parts of a mixture of equal parts of tetrahydrofuran and 1,4-dioxane are introduced into a steel ball mill which has a capacity of 20,000 parts by volume and is run at 50 r.p.m., the binders being introduced in the form of a joint solution in the solvent mixture mentioned. The whole mixture is milled for 5 days in the ball mill, until a test coating produced with a dispersion sample shows adequate surface smoothness. The magnetic dispersion obtained is then filtered through a cellulose/asbestos fiber filter, after which it is applied, by means of a suitable coater, to a 12 μm thick polyethylene terephthalate film, the amount applied being such that after drying in a tunnel dryer and then calendering on a multiple-roll calender to give an average peak-to-peak value of 0.12 μm (measured with an instrument manufactured by Perthen, Hanover, Germany), a 4.5 μm thick layer remains. In the zone of the tunnel dryer where the coating is still fluid, a magnet extending over the entire width of the coating is provided, and serves to orient the magnetic particles in the desired direction. The coated webs thus produced are slit into tapes having a width of 3.81 mm.

TABLE 2

| Example | Material from | Hc (kA/m) | R (mT) | Orientation ratio | Maximum 1 kHz (db) | output level 10 kHz (db) | Kd (db) |
|---|---|---|---|---|---|---|---|
| A | Example 1 | 29.1 | 162 | 3.1 | +1.2 | +0.5 | +1.5 |
| B | Example 2 | 29.4 | 158 | 2.9 | +0.8 | +0.2 | +1.0 |
| C | Example 3 | 29.0 | 155 | 2.8 | +0.5 | +0.8 | +0.5 |
| D | Example 4 | 29.6 | 152 | 2.8 | +1.0 | −0.5 | +2.5 |
| E | Comparative Experiment 1 | 24.3 | 150 | 2.6 | +0.5 | −1.0 | −1.5 |
| F | Comparative Experiment 2 | 24.5 | 136 | 2.2 | −1.5 | −0.8 | −1.0 |
| G | Comparative Experiment 3 | 25.0 | 138 | 2.4 | −1.0 | −1.0 | −1.5 |
| H | Comparative Experiment 4 | 25.2 | 124 | 2.1 | −2.0 | −1.5 | +0.5 |
| I | Comparative Experiment 5 | 24.8 | 130 | 1.9 | −2.5 | −1.8 | +1.0 |
| K | Comparative Experiment 6 | 28.2 | 140 | 2.5 | −1.5 | 0 | +1.0 |
| L | Comparative Experiment 7 | 29.3 | 170 | 2.7 | +1.0 | +0.8 | −4.0 |
| Reference tape T308S | | | | | +1.5− | −1.5 | 0 |

We claim:

1. A process for the preparation of highly coercive acicular gamma-iron(III) oxide from acicular iron(III) oxide hydroxide at a temperature of from 190° to 700° C. comprising: continuously passing the iron(III) oxide hydroxide into a first zone of a furnace having two or more heating zones, the temperature of the first zone being maintained at from 190° to below 250° C., said iron(III) oxide hydroxide being dehydrated to acicular α-iron(III) oxide; conveying the α-iron(III) oxide into the remaining heating zone or zones which zone or zones are at a temperature of from 300° to 700° C. and reducing the α-iron(III) oxide to magnetite in said remaining zone or zones by means of a gaseous mixture of an inert gas and an organic substance that is decomposable at a temperature above 250° C. in the presence of iron oxide and which has a boiling point above 250° C.; and thereafter oxidizing the magnetite to acicular gamma-iron(III) oxide with an oxygen containing gas at from 150° to 400° C., wherein the gaseous mixture acting as the reducing agent is produced by passing a stream of inert gas heated to above 250° C. through said organic substance which is also heated to above 250° C., said inert gas being heated to a temperature not less than the temperature to which the organic substance is heated, and the gaseous mixture on introduction into the furnace is first brought into contact with the α-iron(III) oxide entering said remaining heating zone or zones.

2. A process as set forth in claim 1, wherein the volumetric ratio of organic substance to inert gas is from $1:2.10^2$ to $1:5.10^3$.

3. A process as set forth in claim 1, wherein the amount of organic substance employed is from 0.5 to 10% by weight, based on the amount of acicular iron(III) oxide hydroxide.

* * * * *